US007747599B1

(12) United States Patent
Depelteau et al.

(10) Patent No.: US 7,747,599 B1
(45) Date of Patent: *Jun. 29, 2010

(54) INTEGRATED SEARCH ENGINE DEVICES THAT UTILIZE HIERARCHICAL MEMORIES CONTAINING B-TREES AND SPAN PREFIX MASKS TO SUPPORT LONGEST PREFIX MATCH SEARCH OPERATIONS

(75) Inventors: Gary Michael Depelteau, Ottawa (CA); David Walter Carr, Nepean (CA)

(73) Assignee: NetLogic Microsystems, Inc., Mountain View, CA (US)

( * ) Notice: Subject to any disclaimer, the term of this patent is extended or adjusted under 35 U.S.C. 154(b) by 357 days.

This patent is subject to a terminal disclaimer.

(21) Appl. No.: 11/184,243

(22) Filed: Jul. 19, 2005

Related U.S. Application Data

(60) Provisional application No. 60/590,500, filed on Jul. 23, 2004, provisional application No. 60/642,799, filed on Jan. 11, 2005.

(51) Int. Cl.
*G06F 7/00* (2006.01)
*G06F 17/30* (2006.01)
*G06F 13/00* (2006.01)

(52) U.S. Cl. .................. 707/706; 707/791; 707/797; 711/117

(58) Field of Classification Search ............... 707/1, 707/3, 6, 100
See application file for complete search history.

(56) References Cited

U.S. PATENT DOCUMENTS

| 4,464,650 A | 8/1984 | Eastman et al. |
| 4,606,002 A | 8/1986 | Waisman et al. |
| 5,228,115 A * | 7/1993 | Natarajan .................. 706/46 |
| 5,430,869 A | 7/1995 | Ishak et al. |
| 5,446,887 A | 8/1995 | Berkowitz |
| 5,475,837 A | 12/1995 | Ishak et al. |
| 5,560,007 A | 9/1996 | Thai |
| 5,644,763 A | 7/1997 | Roy |
| 5,666,494 A | 9/1997 | Mote, Jr. |
| 5,758,024 A | 5/1998 | Alleva |
| 5,758,356 A | 5/1998 | Hara et al. |

(Continued)

FOREIGN PATENT DOCUMENTS

WO WO2004088548 10/2004

(Continued)

OTHER PUBLICATIONS

Choudhury et al. "A New Buffer Management Scheme forHierarchical Shared Memory Switches" Oct. 1997 IEEE/ACM Transactions on Networking (TON), vol. 5 Issue 5 Publisher: IEEE Press.*

(Continued)

*Primary Examiner*—Pierre M Vital
*Assistant Examiner*—Berhanu Mitiku
(74) *Attorney, Agent, or Firm*—Mahamedi Paradice Kreisman LLP

(57) ABSTRACT

A search engine device includes a hierarchical memory that is configured to store a b-tree of search prefixes and span prefix masks (SPMs). These SPMs are evaluated during each search operation to identify search prefixes that match an applied search key yet reside at nodes of the b-tree that are not traversed during the search operation. The search engine device also includes handle memory. This handle memory is configured to support a respective handle memory block for each search prefix within each of a plurality of nodes of the b-tree that reside at a leaf parent level within the b-tree. Each of these handle memory blocks may have sufficient capacity to support one result handle per bit within a span prefix mask associated with a corresponding search prefix. In other cases, each of these handle memory blocks may have sufficient capacity to support only M+1 handles, where M is a positive integer corresponding to a quantity of search prefixes supported by each of a plurality of leaf nodes within the b-tree.

8 Claims, 11 Drawing Sheets

U.S. PATENT DOCUMENTS

| | | | |
|---|---|---|---|
| 5,787,430 | A | 7/1998 | Doeringer et al. |
| 5,812,853 | A | 9/1998 | Carroll et al. |
| 5,812,996 | A | 9/1998 | Rubin et al. |
| 5,813,000 | A | 9/1998 | Furlani |
| 5,822,749 | A * | 10/1998 | Agarwal ............... 707/2 |
| 5,897,655 | A | 4/1999 | Mallick |
| 5,918,245 | A | 6/1999 | Yung |
| 5,924,115 | A * | 7/1999 | Von Herzen et al. ........ 711/117 |
| 6,035,326 | A | 3/2000 | Miles et al. |
| 6,041,053 | A | 3/2000 | Douceur et al. |
| 6,098,150 | A | 8/2000 | Brethour et al. |
| 6,115,792 | A | 9/2000 | Tran |
| 6,138,123 | A | 10/2000 | Rathbun |
| 6,219,662 | B1 | 4/2001 | Fuh et al. |
| 6,389,507 | B1 | 5/2002 | Sherman |
| 6,401,117 | B1 | 6/2002 | Narad et al. |
| 6,404,752 | B1 | 6/2002 | Allen, Jr. et al. |
| 6,421,730 | B1 | 7/2002 | Harad et al. |
| 6,430,527 | B1 | 8/2002 | Waters et al. |
| 6,441,053 | B1 | 8/2002 | Klein et al. |
| 6,460,112 | B1 | 10/2002 | Srinivasan et al. |
| 6,460,120 | B1 | 10/2002 | Bass et al. |
| 6,480,839 | B1 | 11/2002 | Whittington et al. |
| 6,490,592 | B1 * | 12/2002 | St. Denis et al. ............ 707/102 |
| 6,522,632 | B1 | 2/2003 | Waters et al. |
| 6,526,055 | B1 * | 2/2003 | Perlman et al. ............. 370/392 |
| 6,532,457 | B1 * | 3/2003 | Tal et al. ................... 707/1 |
| 6,535,491 | B2 | 3/2003 | Gai et al. |
| 6,539,369 | B2 | 3/2003 | Brown |
| 6,553,370 | B1 | 4/2003 | Andreev et al. |
| 6,564,211 | B1 | 5/2003 | Andreev et al. |
| 6,611,832 | B1 | 8/2003 | van Lunteren |
| 6,614,789 | B1 | 9/2003 | Yazdani et al. |
| 6,633,865 | B1 | 10/2003 | Liao |
| 6,636,849 | B1 | 10/2003 | Tang et al. |
| 6,636,956 | B1 | 10/2003 | Venkatachary et al. |
| 6,662,287 | B1 | 12/2003 | Andreev et al. |
| 6,691,124 | B2 | 2/2004 | Gupta et al. |
| 6,694,323 | B2 | 2/2004 | Bumbulis |
| 6,697,276 | B1 | 2/2004 | Pereira et al. |
| 6,707,693 | B1 | 3/2004 | Ichiriu |
| 6,757,779 | B1 | 6/2004 | Nataraj et al. |
| 6,768,739 | B1 | 7/2004 | Kobayashi et al. |
| 6,778,530 | B1 | 8/2004 | Greene |
| 6,782,382 | B2 | 8/2004 | Lunteren |
| 6,831,850 | B2 | 12/2004 | Pereira et al. |
| 6,839,800 | B2 | 1/2005 | Stark |
| 6,859,455 | B1 | 2/2005 | Yazdani et al. |
| 6,928,430 | B1 | 8/2005 | Chien et al. |
| 6,934,795 | B2 | 8/2005 | Nataraj et al. |
| 6,941,314 | B2 | 9/2005 | Andreev et al. |
| 6,944,709 | B2 | 9/2005 | Nataraj et al. |
| 7,007,027 | B2 | 2/2006 | Najork et al. |
| 7,016,904 | B1 | 3/2006 | Grove et al. |
| 7,017,021 | B2 | 3/2006 | Gupta et al. |
| 7,023,807 | B2 * | 4/2006 | Michels et al. ............. 370/238 |
| 7,035,844 | B2 | 4/2006 | Andreev et al. |
| 7,047,317 | B1 | 5/2006 | Huie et al. |
| 7,062,499 | B2 | 6/2006 | Nehru et al. |
| 7,076,602 | B2 | 7/2006 | Stark et al. |
| 7,107,263 | B2 | 9/2006 | Yianilos et al. |
| 7,162,572 | B2 | 1/2007 | Somasundaram |
| 7,231,383 | B2 | 6/2007 | Andreev et al. |
| 7,257,530 | B2 | 8/2007 | Yin |
| 7,289,979 | B2 | 10/2007 | Wilson |
| 7,292,162 | B2 | 11/2007 | Samasundaram |
| 7,383,276 | B2 | 6/2008 | Lomet |
| 7,426,518 | B2 | 9/2008 | Venkatachary et al. |
| 7,437,354 | B2 | 10/2008 | Venkatachary et al. |
| 7,478,109 | B1 | 1/2009 | Panigraphy et al. |
| 7,571,156 | B1 | 8/2009 | Gupta et al. |
| 7,603,346 | B1 | 10/2009 | Depelteau et al. |
| 7,653,619 | B1 | 1/2010 | Depelteau et al. |
| 2002/0089937 | A1 | 7/2002 | Venkatachary et al. |
| 2002/0116526 | A1 | 8/2002 | Brown |
| 2002/0146009 | A1 | 10/2002 | Gupta et al. |
| 2002/0147721 | A1 | 10/2002 | Gupta et al. |
| 2002/0152413 | A1 | 10/2002 | Waters et al. |
| 2002/0161969 | A1 | 10/2002 | Nataraj et al. |
| 2003/0009453 | A1 | 1/2003 | Basso et al. |
| 2003/0009466 | A1 | 1/2003 | Ta et al. |
| 2003/0093613 | A1 | 5/2003 | Sherman |
| 2003/0093646 | A1 | 5/2003 | Stark |
| 2003/0123397 | A1 | 7/2003 | Lee et al. |
| 2003/0123459 | A1 | 7/2003 | Liao |
| 2003/0163302 | A1 | 8/2003 | Yin |
| 2003/0182272 | A1 | 9/2003 | Leung et al. |
| 2004/0030686 | A1 | 2/2004 | Cardno et al. |
| 2004/0059731 | A1 | 3/2004 | Yianilos et al. |
| 2004/0062208 | A1 | 4/2004 | Brown et al. |
| 2004/0082416 | A1 | 4/2004 | Stark et al. |
| 2004/0083336 | A1 | 4/2004 | Stark et al. |
| 2004/0109451 | A1 * | 6/2004 | Huang et al. ................. 370/392 |
| 2004/0139274 | A1 * | 7/2004 | Hui ............................ 711/108 |
| 2004/0170379 | A1 * | 9/2004 | Yao et al. ..................... 386/46 |
| 2004/0193619 | A1 | 9/2004 | Venkatachary et al. |
| 2004/0205229 | A1 | 10/2004 | Stojancic |
| 2004/0249803 | A1 | 12/2004 | Vankatachary et al. |
| 2005/0091443 | A1 | 4/2005 | Hershkovich et al. |
| 2005/0131867 | A1 * | 6/2005 | Wilson ......................... 707/3 |
| 2005/0163122 | A1 | 7/2005 | Sahni et al. |
| 2005/0195832 | A1 | 9/2005 | Dharmapurikar et al. |
| 2006/0167843 | A1 | 7/2006 | Allwright et al. |
| 2006/0259682 | A1 | 11/2006 | Somasundaram |
| 2007/0038626 | A1 | 2/2007 | Waters et al. |
| 2007/0276648 | A1 | 11/2007 | Andreev et al. |

FOREIGN PATENT DOCUMENTS

| | | | |
|---|---|---|---|
| WO | WO2004088548 | A1 | 10/2004 |

OTHER PUBLICATIONS

Djordjevic et al."A hierarchical memory system environment" Jun. 1998 Proceedings of the 1998 workshop Computer architecture education WCAE '98 Publisher: ACM Press.*

Aggarwal et al. "A Model for Hierarchical Memory" Jan. 1987 Proceedings of the nineteenth annual ACM conference on Theory of computing STOC '87 Publisher: ACM Press.*

Choudhury et al. "A New Buffer Management Scheme for Hierarchical Shared Memory Switches" Oct. 1997 IEEE/ACM Transactions on Networking (TON), vol. 5 Issue 5 Publisher: IEEE Press.*

Uga et al. "A fast and compact longest match prefix look-up method using pointer cache for very long network address", IT Network Service Systems Laboratories Midori 3-9-1 1, Musashino, Tokyo 180-8585, Japan, 1999 IEEE.*

Srinivasan et al. "Fast Address Lookups Using Controlled Prefix Expansion" Washington University in St. Louis, ACM Sigmetrics '98/ Performance '98 Joint International Conference on Measurement and Modeling of Computer Systems.*

Kobayashi et al. "A Longest Prefix Match Search Engine for Multi-Gigabit IP Processing", C&C Media Research Laboratories, NEC Corporation 2000 IEEE.*

Bender et al. "Cache-Oblivious B-Trees", SIAM J. Comput, 2000, pp. 1-18.*

Bender et al., "Cache-oblivious B-trees," SIAM J. Comput. 2000, pp. 1-18.

R. Bayer et al., "Prefix B-Trees," ACM Trans. On Database Systems, vol. 2, No. 1, Mar. 1977, pp. 11-26.

Lu et al., "A B-Tree Dynamic Router-Table Design," http://www.cise.ufl.edu/~sahn/papers/btree.pdf, Admitted Prior Art, 27 pages.

Suri, et al., "Multiway Range Trees: Scalable IP Lookup with Fast Updates," http:/www.cs.edu/~varghese/PAPERS/globecome2001.pdf, Admitted Prior Art, 5 pages.

"B-Trees: Balanced Tree Data Structures," http://www.bluerwhite.org/btree/, Admitted Prior Art, Printed, 8 pages.

Chang et al. "Dynamic Routing Tables using Augmented Balanced Search Tree" *National Cheng Kung University and I-Shou University* 35 pages (believed prior to Jul. 23, 2004).

O'Connor et al. "The iFlow Address Processor " 2001 *IEEE Micro* 16-23 (2001).

Bayer, R. et al., "Prefix B-Trees," ACM Trans. On Database Systems, vol. 2, No. 1, Mar. 1977, pp. 11-26.

Henry Hong-yi Tzeng, "Longest Prefix Search Using Compressed Trees", In Proceedings of IEEE Globe.com, 1998.

Nasser Yazdani et al., "Prefix Trees: New Efficient Data Structures for Matching Strings of Different Lengths", IEEE, 2001, p. 76-85.

Answers.com, http://www.answers.com/topic/b-tree, B~tree: Information From Answers.com, Admitted prior art. 6 pages.

B*-tree, http://en.wikipedia.org/wiki/B%2A-tree, Admitted prior art. 1 page.

Canonical form http://en.wikipedia.org/wiki/Canonical_form, Admitted prior art, 1 page.

Chang et al., "Dynamic Routing Tables using Augmented Balanced Search Tree," National Cheng Kung University and I-Shou University, Admitted Prior Art, 35 pages.

Network address processor makes embedded DRAM a virtue, http://www.electronicproducts.com/print.asp?ArticleURL=oct12.oct2000, Printed Aug. 14, 2006, Admitted Prior Art, 1 page.

O'Connor et al., "The iFlow Address Processor," 2001 IEEE, pp. 16-23.

Tree (data structure), http://en.wikipedia.org/wiki/Tree_data_structure, (Redirected from Tree data structure, Admitted prior art. 2 pages.

Final Office Action dated Aug. 4, 2009 for U.S. Appl. No. 11/674,487, 22 Pages.

Final Office Action dated Dec. 8, 2009 for U.S. Appl. No. 11/768,646, 13 Pages.

Final Office Action dated Nov. 24, 2009 for U.S. Appl. No. 11/685,982, 20 Pages.

Non-final Office Action dated Apr. 1, 1999 for U.S. Appl. No. 11/532,225, 8 Pages.

Non-final Office Action dated Oct. 15, 2009 for U.S. Appl. No. 11/864,290, 15 Pages.

Non-final Office Action dated Dec. 11, 2008 for U.S. Appl. No. 11/674,487, 23 Pages.

Non-final Office Action dated Dec. 11, 2008 U.S. Appl. No. 11/674,474, now Issued Patent 7,603,346, 22 Pages.

Non-final Office Action dated Jun. 25, 2009 for U.S. Appl. No. 11/768,646, 12 Pages.

Non-final Office Action dated Jul. 21, 2009 for U.S. Appl. No. 11/685,982, 20 Pages.

Non-final Office Action dated Sep. 10, 2009 for U.S. Appl. No. 11/532,225, 8 Pages.

Notice of Allowance dated Dec. 2, 2009 for U.S. Appl. No. 11/674,487, 11 Pages.

Notice of Allowance dated Aug. 7, 2009 U.S. Appl. No. 11/674,474, now Issued Patent 7,603,346, 13 Pages.

Notice of Allowance dated Jan. 12, 2010 for U.S. Appl. No. 11/532,225, 6 Pages.

* cited by examiner

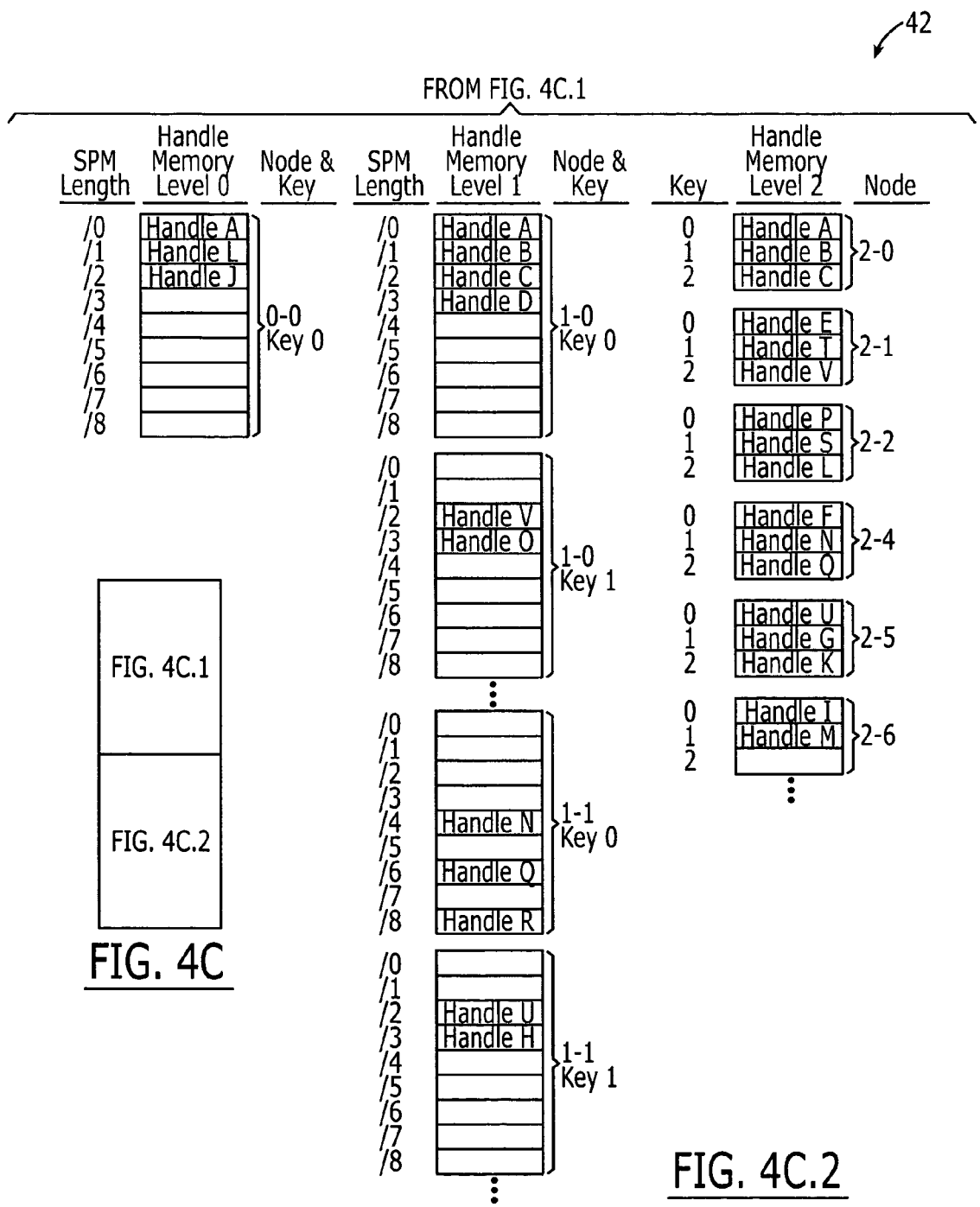

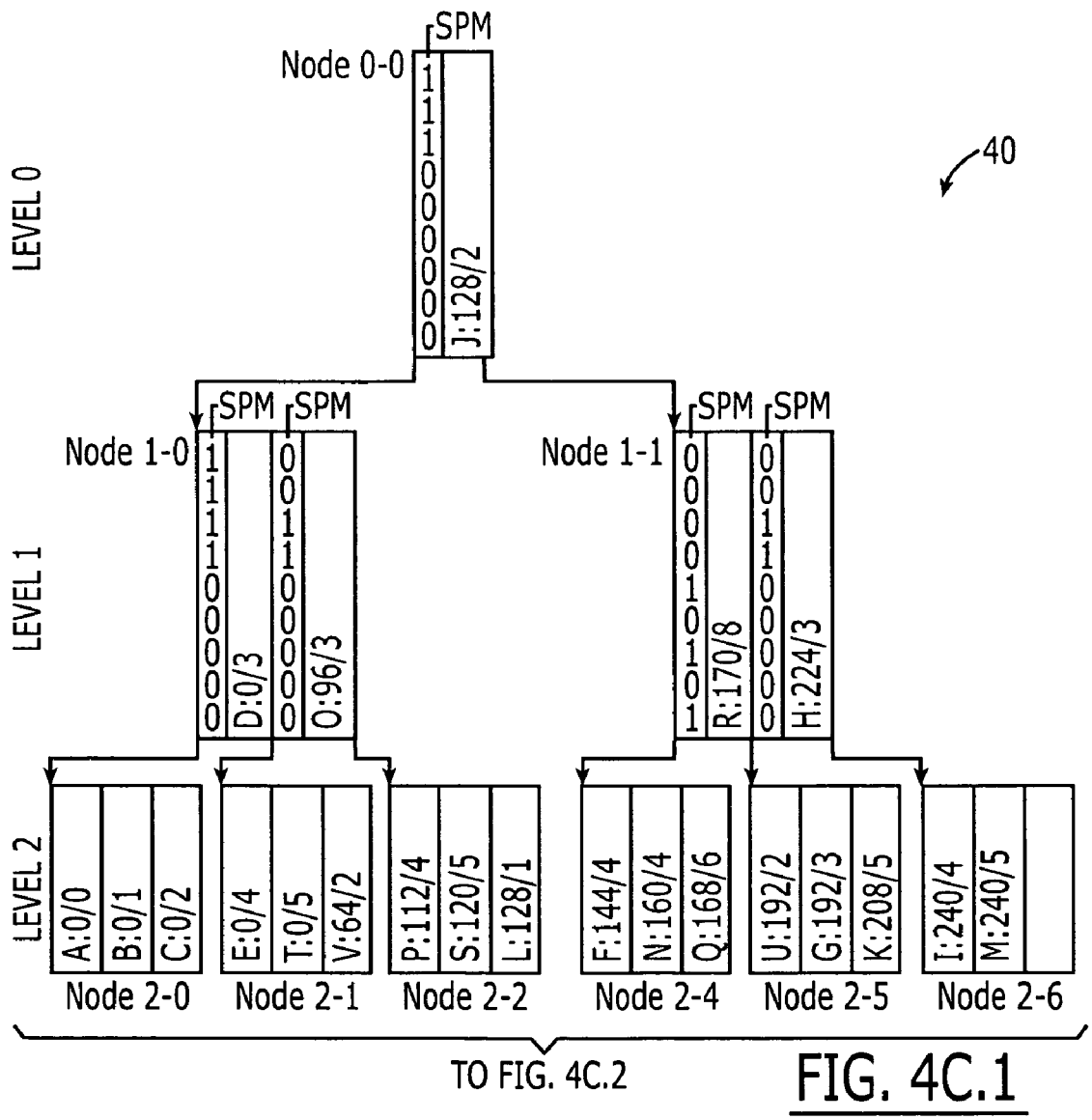
FIG. 4C.1

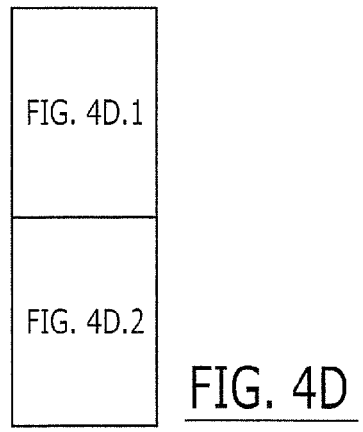

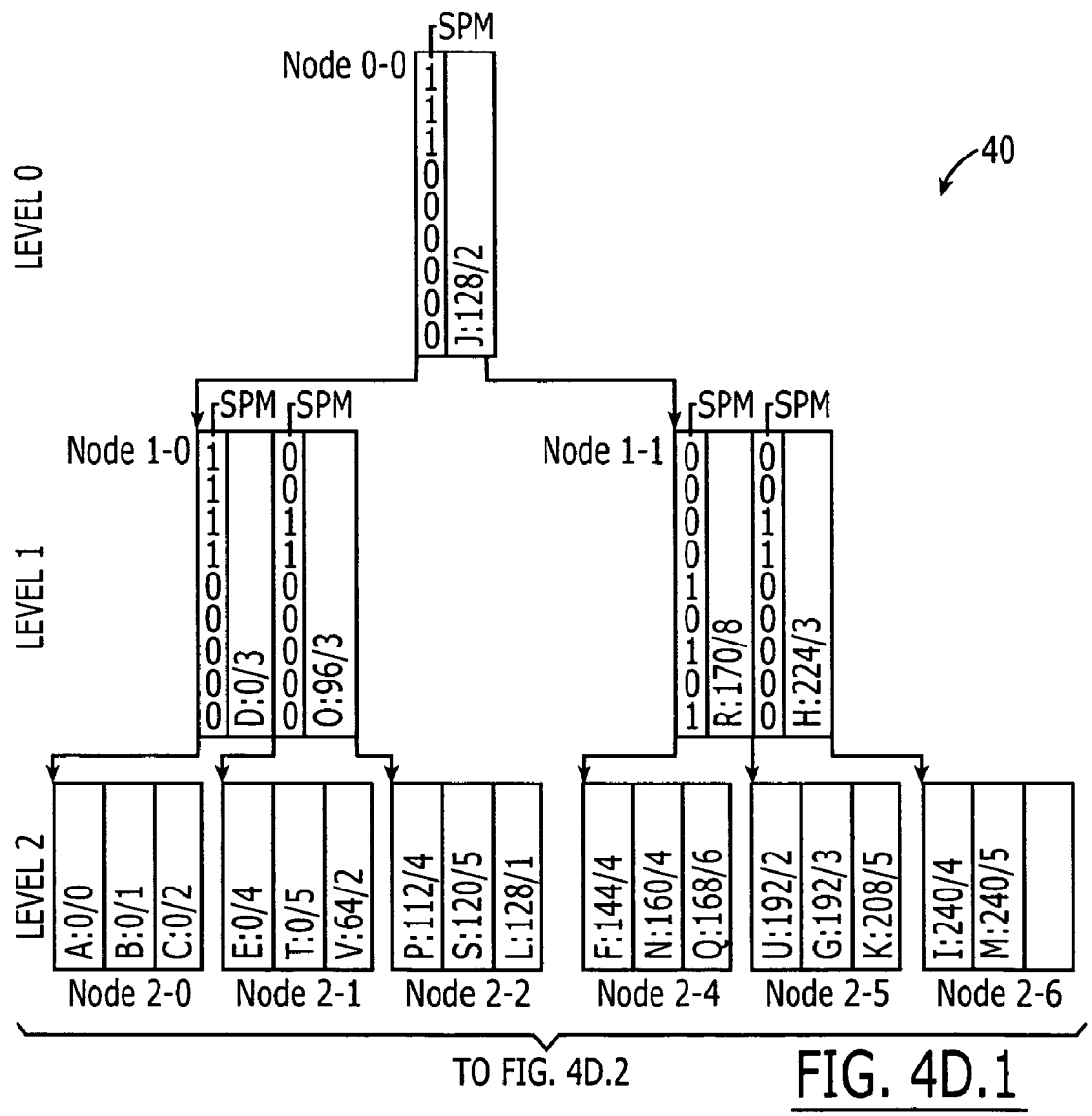
FIG. 4D.1

INTEGRATED SEARCH ENGINE DEVICES THAT UTILIZE HIERARCHICAL MEMORIES CONTAINING B-TREES AND SPAN PREFIX MASKS TO SUPPORT LONGEST PREFIX MATCH SEARCH OPERATIONS

REFERENCE TO PRIORITY APPLICATION

This application claims priority to U.S. Provisional Application Ser. Nos. 60/590,500, filed Jul. 23, 2004 and 60/642,799, filed Jan. 11, 2005, the disclosures of which are hereby incorporated herein by reference.

FIELD OF THE INVENTION

The present invention relates to integrated circuit devices and, more particularly, to integrated circuit search engine devices and methods of operating same.

BACKGROUND OF THE INVENTION

Linear sorting techniques may be utilized to arrange a plurality of search prefixes within an integrated circuit search device. One such linear sorting technique is based on the starting address of a prefix range associated with each search prefix. In the event a plurality of the search prefixes have the same starting address but different prefix lengths, then a search prefix with a shorter prefix length may be treated as "less than" a search prefix with a longer prefix length. One example of a plurality of 8-bit search prefixes is illustrated by TABLE 1.

The search prefixes in TABLE 1 may be sorted linearly as shown in FIG. 1, with the smallest search prefix having the shortest prefix length (e.g., A:0/0) located on the left side of the array 10 and the largest search prefix with the longest search prefix (e.g., M:240/5) located on the right side on the array 10. To perform a linear search (i.e., lookup) operation, an applied search key is compared with every search prefix in the array 10, starting with the search prefix on the left side of the array 10, until a search prefix is found with a start address that is greater than the applied search key. Each search prefix in the array 10 that matches the applied search key is a potential longest prefix match. Once the search operation terminates at the right side of the array 10 (or at a search prefix with a start address than is greater than the applied search key), the rightmost search prefix that matches the search key is treated as the longest prefix match (LPM).

TABLE 1

| ID | KEY |
|---|---|
| A | 0/0 |
| B | 0/1 |
| C | 0/2 |
| D | 0/3 |
| E | 0/4 |
| F | 144/4 |
| G | 192/3 |
| H | 224/3 |
| I | 240/4 |
| J | 128/2 |
| K | 208/5 |
| L | 128/1 |
| M | 248/5 |
| N | 160/4 |

TABLE 1-continued

| ID | KEY |
|---|---|
| O | 96/3 |
| P | 112/4 |
| Q | 168/6 |
| R | 170/8 |
| S | 120/5 |
| T | 0/5 |
| U | 192/2 |
| V | 64/2 |

This search operation is an iterative process, with each search prefix being compared in sequence with the applied search key. As illustrated by FIG. 2, this process can also be implemented in a hardware-based array 20, by simultaneously comparing the applied search key (e.g., 171) to all of the search prefixes within the array 20, using a plurality of comparators 22 that generate match and non-match signals. In particular, each match between the applied search key and a search prefix results in the generation of a match signal (M) and each non-match results in the generation of a "less than" signal (LT) or a "greater than" signal (GT). The comparators 22 may generate these signals as two-bit binary signals (e.g., M=11b, LT=01b, and GT=10b). The longest prefix match is represented by the search prefix associated with the rightmost match signal M, which in FIG. 2 is represented by the search prefix Q:168/6. This longest prefix match may be identified using a priority encoder (not shown) that is configured to receive the signals generated by the comparators 22.

Conventional network routing applications may also utilize tree data structures to support search operations within an integrated circuit device. These tree data structures may include b-tree (e.g., multi-way tree) structures that are preferably kept balanced to prevent one or more branches of the tree from becoming significantly longer that other branches of the tree and thereby increasing search latency. FIG. 3 illustrates a three-level b-tree data structure 30 containing the search prefixes of TABLE 1 and the array 20 of FIG. 2. This b-tree 30 is illustrated as including six leaf nodes at Level 2 (i.e., Nodes 2-0, 2-1, 2-2, 2-4, 2-5 and 2-6), two leaf nodes at Level 1 (Node 1-0 and 1-1) and a root node at Level 0 (Node 0-0). As illustrated by the highlighted search path, a search of the b-tree using 171 as a search key begins at Node 0-0. The search prefix J at Node 0-0 represents a match with the search key 171 because 171 (i.e., 10101011b) is a match with 128/2 (i.e., 10XXXXXX), where X represents a "don't-care" value. The search then proceeds to Node 1-1 (i.e., along a right-side branch from Node 0-0 to Node 1-1) because 171 is greater than 128. No matches are present at Node 1-1 because the search key 171 (i.e., 10101011b) does not match either the search prefix R: 170/8 (10101010b) or the search prefix H:224/3 (i.e., 111XXXXX). Because the search key 171 is greater than 170 and less than 224, the search then proceeds to and terminates at Node 2-5, which is a leaf node of the b-tree 30. None of the search prefixes U:192/2, G:192/3 or K:208/5 at Node 2-5 represent a match with the search key 171. Thus, based on the illustrated search path, which traverses Nodes 0-0, 1-1 and 2-5 of the b-tree 30, only search prefix J:128/2 represents a matching entry within the search key 171. However, as illustrated best by FIG. 2, the search prefix Q:168/6, which resides at Node 2-4 of FIG. 3, actually represents the longest prefix match with the search key 171, yet this search prefix was not within the search path and was not detected during the search operation. Moreover, the search prefixes A:0/0, L:128/1 and N:160/4 also represent matches that were not within the search path. This means that the conventional sorting of prefixes within the b-tree 30 of FIG. 3 will not yield correct results for all search keys.

Another example of a b-tree data structure is described in U.S. Pat. No. 6,490,592, which is assigned to Nortel Networks Limited. As described at Col. 1 of the '592 patent, conventional b-tree data structures may not be well suited for search operations that require identification of longest prefix matches (LPMs) within the b-tree data structure. To address this limitation, the '592 patent describes a modified b-tree data structure that is arranged so that data elements stored therein that have no overlapping prefixes are arranged in a standard b-tree structure. However, other data elements that have overlapping prefixes are arranged in a modified structure so that the prefix of such a data element contains the prefixes of all such data elements that succeed it in the b-tree. This modified structure is referred to as an L-structure. FIG. 3 of the '592 patent shows portions 300 and 340 that comprise a b-tree into which an L-structure 320 is inserted. Unfortunately, the use of L-structures within a b-tree may represent a form of prefix nesting that reduces a likelihood of achieving ideal b-tree properties that typically reduce search latency and result in efficient utilization of memory space. In particular, for a fixed memory capacity and latency, which is related to tree height, the number of search prefixes that can be supported within the b-tree of the '592 patent is statistically dependent on the degree of nesting within the prefix data set supported by the b-tree. Accordingly, prefix data sets that require a high degree of nesting may result in an inefficient utilization of the memory space that is required to maintain the b-tree.

SUMMARY OF THE INVENTION

A search engine device according to first embodiments of the present invention includes a hierarchical memory that is configured to store a b-tree of search prefixes and span prefix masks (SPMs). Some of these SPMs are evaluated during each search operation. SPMs serve to identify search prefixes that match an applied search key, yet reside at nodes of the b-tree that are not traversed during the search operation (i.e., lie lower and left of the search path). The search engine device also includes handle memory. This handle memory is configured to support a respective handle memory block for each search prefix within each of a plurality of nodes of the b-tree that reside at a leaf parent level within the b-tree. Each of these handle memory blocks may have sufficient capacity to support one result handle per bit within a span prefix mask associated with a corresponding search prefix. In other cases, each of these handle memory blocks may have sufficient capacity to support only M+1 handles, where M is a positive integer corresponding to a quantity of search prefixes supported by each of a plurality of leaf nodes within the b-tree.

Additional embodiments of the present invention include methods of searching a b-tree of search prefixes within a hierarchical memory. These methods include evaluating span prefix masks (SPMs) associated with each of a plurality of search prefixes located at first nodes within the b-tree during a search operation. This evaluating step is performed to identify search prefixes that match an applied search key yet reside at nodes of the b-tree that are not traversed during the search operation. In this manner, search prefixes that represent longest prefix matches can be identified in situations where a conventional b-tree search operation would not correctly detect a longest prefix match. These span prefix masks may be configured so that each bit of the mask that has been set operates to identify a respective search prefix within the b-tree. In particular, each bit of a first one of the span prefix masks that has been set identifies a respective search prefix within the b-tree having a value that is less than a value of the search prefix to which the first one of the span prefix masks corresponds.

Still further embodiments of the present invention include a search engine device having a hierarchical memory therein. This hierarchical memory is configured to store first search prefixes and corresponding span prefix masks. These span prefix masks are configured to identify second search prefixes in the hierarchical memory during search operations.

BRIEF DESCRIPTION OF THE DRAWINGS

FIG. 4C illustrates the three-level b-tree data structure of FIG. 4A along with a diagram that illustrates an allocation of handle memory to support the corresponding b-tree data structure.

FIG. 4D illustrates the three-level b-tree data structure of FIG. 4A along with a diagram that illustrates an alternative allocation of handle memory to support the corresponding b-tree data structure when M<W, where M is a positive integer that represents a maximum number of search prefixes within a leaf node of the b-tree and W is a positive integer that represents a width of the search prefixes.

DESCRIPTION OF PREFERRED EMBODIMENTS

Figure 1:
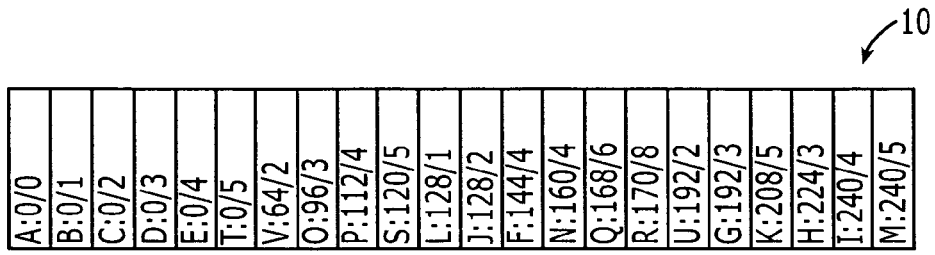
FIG. 1 illustrates a plurality of 8-bit search prefixes of varying prefix length that are sorted linearly based on prefix value (address) and prefix length, according to the prior art.
Figure 2:
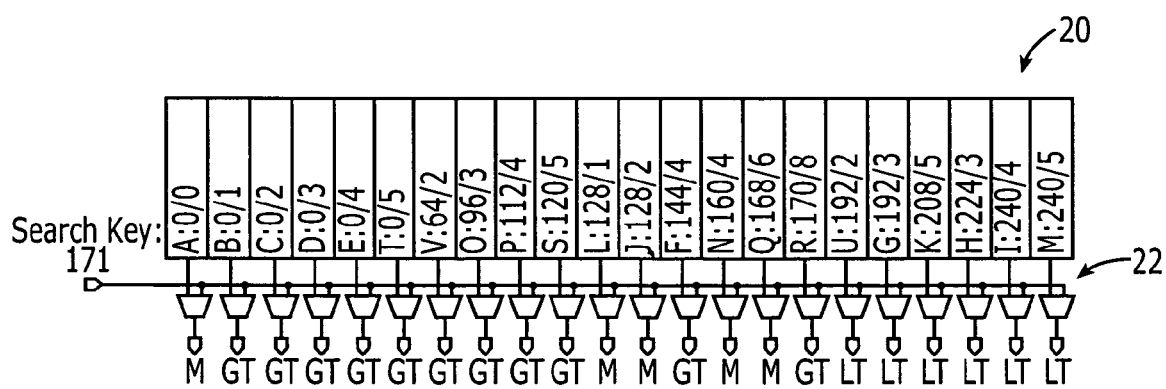
FIG. 2 illustrates a conventional hardware-based array of search prefixes that supports parallel search operations.

The present invention now will be described more fully with reference to the accompanying drawings, in which preferred embodiments of the invention are shown. This invention may, however, be embodied in many different forms and should not be construed as being limited to the embodiments set forth herein; rather, these embodiments are provided so that this disclosure will be thorough and complete, and will fully convey the scope of the invention to those skilled in the art. Like reference numerals refer to like elements throughout.

Figure 4A:
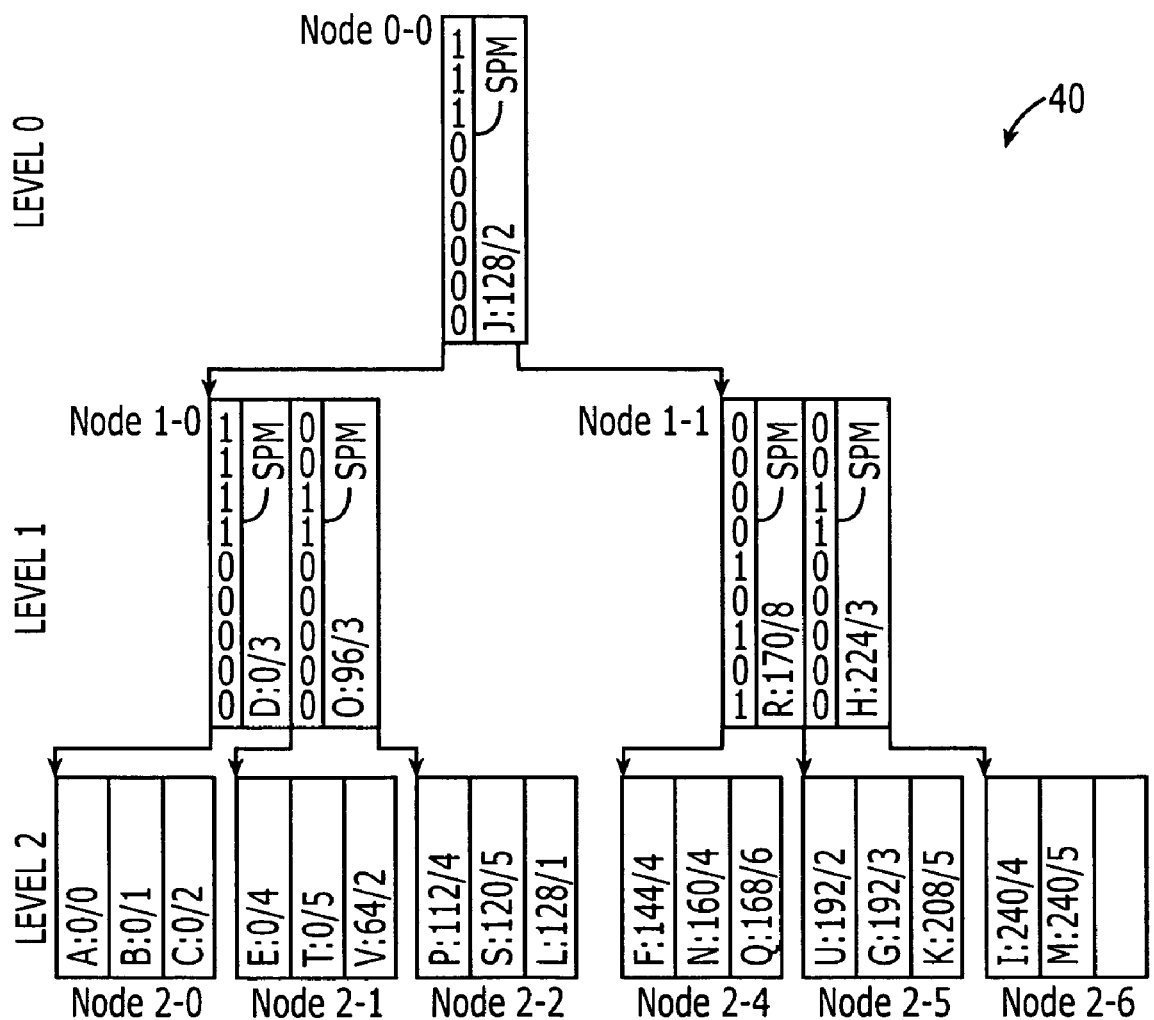
FIG. 4A illustrates a three-level b-tree data structure that contains search prefixes and span prefix masks (SPMs) according to an embodiment of the present invention.

FIG. 4A illustrates a b-tree 40 that contains search prefixes and span prefix masks (SPMs) according to an embodiment of the present invention, which may be embodied within a hardware search engine device containing a hierarchical memory. The b-tree 40 includes a root node (Node 0-0) at Level 0, two nodes (Node 1-0 and 1-1) at Level 1 and six nodes (Node 2-0, 2-1, 2-2, 2-4, 2-5 and 2-6) at Level 2. The six nodes at Level 2 represent leaf nodes. Each leaf node is configured to support a maximum of three search prefixes. The two nodes at Level 1 represent nodes at the leaf parent level (i.e., one level above the leaf nodes). Each of the nodes at Level 1 support two search prefixes and two span prefix masks. The root node supports 1 search prefix and one span prefix mask. These span prefix masks (SPMs) supplement the b-tree 40 to ensure that all matches for a search key, including a longest prefix match, are always found in response to a search operation. Each span prefix mask may contain W+1 mask bits in the form of a mask vector, where W is a positive integer that represents a width of the search prefixes in the non-leaf nodes of the b-tree 40. For purposes of illustration only, these search prefixes are illustrated as having a width W of eight (8) bits, however, most applications require the use of search prefixes that are substantially wider that those illustrated herein. Each span prefix mask associated with a respective search prefix in a non-leaf node identifies the search prefix itself and all shorter prefixes of the search prefix that are located below and to the left of the search prefix in the b-tree 40. Thus, the span prefix mask for the search prefix J:128/2, for example, is configured to identify the search prefix J:128/2 and the shorter prefixes L:128/1 and A:0/0, which are located at leaf nodes 2-0 and 2-2, respectively. The search prefixes at the leaf nodes do not require span prefix masks because these prefixes are located at terminal nodes of the b-tree 40 and no shorter prefixes exist at any lower level of the b-tree 40.

To determine bits 0 through 8 of the 9-bit SPM corresponding to search prefix J:128/2 at node 0-0, bit-by-bit AND operations may be performed between the search prefix J and the nine 8-bit vectors illustrated by TABLE 2. Performing these AND operations results in the identification of search prefixes A:0/0, L:128/1 and J:128/2, which means the span prefix mask corresponding to search prefix J:128/2 within the b-tree 40 equals: SPM[0:8]=111000000.

TABLE 2

| SPM LENGTH | VECTOR | SEARCH PREFIX | "AND" RESULT | IS RESULT EQUAL TO SEARCH PREFIX OR SHORTER PREFIX WITHIN B-TREE? | SPM VALUE |
|---|---|---|---|---|---|
| /0 | 00000000 | 128 = 10000000 | 0/0 = A | YES | SPM[0] = 1 |
| /1 | 10000000 | 128 = 10000000 | 128/1 = L | YES | SPM[1] = 1 |
| /2 | 11000000 | 128 = 10000000 | 128/2 = J | YES | SPM[2] = 1 |
| /3 | 11100000 | 128 = 10000000 | 128/3 | NO | SPM[3] = 0 |
| /4 | 11110000 | 128 = 10000000 | 128/4 | NO | SPM[4] = 0 |
| /5 | 11111000 | 128 = 10000000 | 128/5 | NO | SPM[5] = 0 |
| /6 | 11111100 | 128 = 10000000 | 128/6 | NO | SPM[6] = 0 |
| /7 | 11111110 | 128 = 10000000 | 128/7 | NO | SPM[7] = 0 |
| /8 | 11111111 | 128 = 10000000 | 128/8 | NO | SPM[8] = 0 |

To determine bits 0 through 8 of the 9-bit SPM corresponding to search prefix D:0/3 at node 1-0, bit-by-bit AND operations may be performed between the search prefix D and the nine 8-bit vectors illustrated by TABLE 3. Performing these AND operations results in the identification of search prefixes A:0/0, B:0/1, C:0/2 and D:0/3, which means the span prefix mask corresponding to search prefix D:0/3 within the b-tree 40 equals: SPM[0:8]=111100000.

TABLE 3

| SPM LENGTH | VECTOR | SEARCH PREFIX | "AND" RESULT | IS RESULT EQUAL TO SEARCH PREFIX OR SHORTER PREFIX WITHIN B-TREE? | SPM VALUE |
|---|---|---|---|---|---|
| /0 | 00000000 | 0 = 10000000 | 0/0 = A | YES | SPM[0] = 1 |
| /1 | 10000000 | 0 = 10000000 | 0/1 = B | YES | SPM[1] = 1 |
| /2 | 11000000 | 0 = 10000000 | 0/2 = C | YES | SPM[2] = 1 |
| /3 | 11100000 | 0 = 10000000 | 0/3 = D | YES | SPM[3] = 1 |
| /4 | 11110000 | 0 = 10000000 | 0/4 | NO | SPM[4] = 0 |
| /5 | 11111000 | 0 = 10000000 | 0/5 | NO | SPM[5] = 0 |
| /6 | 11111100 | 0 = 10000000 | 0/6 | NO | SPM[6] = 0 |
| /7 | 11111110 | 0 = 10000000 | 0/7 | NO | SPM[7] = 0 |
| /8 | 11111111 | 0 = 10000000 | 0/8 | NO | SPM[8] = 0 |

To determine bits 0 through 8 of the 9-bit SPM corresponding to search prefix O:96/3 at node 1-0, bit-by-bit AND operations may be performed between the search prefix O and the nine 8-bit vectors illustrated by TABLE 4. Performing these AND operations results in the identification of search prefixes V:64/2 and O:96/3, which means the span prefix mask corresponding to search prefix O:96/3 within the b-tree 40 equals: SPM[0:8]=001100000.

TABLE 4

| SPM LENGTH | VECTOR | SEARCH PREFIX | "AND" RESULT | IS RESULT EQUAL TO SEARCH PREFIX OR SHORTER PREFIX WITHIN B-TREE? | SPM VALUE |
| --- | --- | --- | --- | --- | --- |
| /0 | 00000000 | 96 = 01100000 | 0/0 | NO | SPM[0] = 0 |
| /1 | 10000000 | 96 = 01100000 | 0/1 | NO | SPM[1] = 0 |
| /2 | 11000000 | 96 = 01100000 | 64/2 = V | YES | SPM[2] = 1 |
| /3 | 11100000 | 96 = 01100000 | 96/3 = O | YES | SPM[3] = 1 |
| /4 | 11110000 | 96 = 01100000 | 96/4 | NO | SPM[4] = 0 |
| /5 | 11111000 | 96 = 01100000 | 96/5 | NO | SPM[5] = 0 |
| /6 | 11111100 | 96 = 01100000 | 96/6 | NO | SPM[6] = 0 |
| /7 | 11111110 | 96 = 01100000 | 96/7 | NO | SPM[7] = 0 |
| /8 | 11111111 | 96 = 01100000 | 96/8 | NO | SPM[8] = 0 |

To determine bits 0 through 8 of the 9-bit SPM corresponding to search prefix R:170/8 at node 1-1, bit-by-bit AND operations may be performed between the search prefix R and the nine 8-bit vectors illustrated by TABLE 5. Performing these AND operations results in the identification of search prefixes N:160/4, Q:168/6 and R:170/8, which means the span prefix mask corresponding to search prefix R:170/8 within the b-tree 40 equals: SPM[0:8]=000010101.

TABLE 5

| SPM LENGTH | VECTOR | SEARCH PREFIX | "AND" RESULT | IS RESULT EQUAL TO SEARCH PREFIX OR SHORTER PREFIX WITHIN B-TREE? | SPM VALUE |
| --- | --- | --- | --- | --- | --- |
| /0 | 00000000 | 170 = 10101010 | 0/0 | NO | SPM[0] = 0 |
| /1 | 10000000 | 170 = 10101010 | 128/1 | NO | SPM[1] = 0 |
| /2 | 11000000 | 170 = 10101010 | 128/2 | NO | SPM[2] = 0 |
| /3 | 11100000 | 170 = 10101010 | 160/3 | NO | SPM[3] = 0 |
| /4 | 11110000 | 170 = 10101010 | 160/4 = N | YES | SPM[4] = 1 |
| /5 | 11111000 | 170 = 10101010 | 168/5 | NO | SPM[5] = 0 |
| /6 | 11111100 | 170 = 10101010 | 168/6 = Q | YES | SPM[6] = 1 |
| /7 | 11111110 | 170 = 10101010 | 170/7 | NO | SPM[7] = 0 |
| /8 | 11111111 | 170 = 10101010 | 170/8 = R | YES | SPM[8] = 1 |

To determine bits 0 through 8 of the 9-bit SPM corresponding to search prefix H:224/3 at node 1-1, bit-by-bit AND operations may be performed between the search prefix H and the nine 8-bit vectors illustrated by TABLE 6. Performing these AND operations results in the identification of search prefixes U:192/3 and H:224/3, which means the span prefix mask corresponding to search prefix H:224/8 within the b-tree 40 equals: SPM[0:8]=001100000.

TABLE 6

| SPM LENGTH | VECTOR | SEARCH PREFIX | "AND" RESULT | IS RESULT EQUAL TO SEARCH PREFIX OR SHORTER PREFIX WITHIN B-TREE? | SPM VALUE |
| --- | --- | --- | --- | --- | --- |
| /0 | 00000000 | 224 = 11100000 | 0/0 | NO | SPM[0] = 0 |
| /1 | 10000000 | 224 = 11100000 | 128/1 | NO | SPM[1] = 0 |
| /2 | 11000000 | 224 = 11100000 | 192/2 = U | YES | SPM[2] = 1 |
| /3 | 11100000 | 224 = 11100000 | 224/3 = H | YES | SPM[3] = 1 |
| /4 | 11110000 | 224 = 11100000 | 224/4 | NO | SPM[4] = 0 |
| /5 | 11111000 | 224 = 11100000 | 224/5 | NO | SPM[5] = 0 |
| /6 | 11111100 | 224 = 11100000 | 224/6 | NO | SPM[6] = 0 |
| /7 | 11111110 | 224 = 11100000 | 224/7 | NO | SPM[7] = 0 |
| /8 | 11111111 | 224 = 11100000 | 224/8 | NO | SPM[8] = 0 |

As illustrated by TABLES 2-6, the bit corresponding to the longest prefix that is set within a span prefix mask represents the search prefix associated with the span prefix mask. For example, as illustrated by TABLE 2, the /2 bit of the span prefix mask associated with the search prefix J:128/2 in node 0-0 corresponds to J:128/2 itself. As will be understood by those skilled in the art, the search prefix associated with a span prefix mask can always be inferred, but it is preferable in hardware and software implementations of the search operations described herein to set the span prefix mask bit corresponding to the search prefix. For some implementations, the setting of this bit can also result in an efficient way of encoding the length of the search prefix based on the bit position of the longest prefix bit of the span prefix mask that is set for the search prefix. This can save a bit within $\log_2 W$ bits per search prefix, depending on how an implementation operates to encode the prefix length.

Fortunately, each search prefix need only be represented once per level of the b-tree 40 to a guarantee a first pass search success for all possible search keys. At each level, a search prefix that is lower and to the left of a search prefix at a node at that level should be represented in the span prefix mask of the left-most (i.e., least) possible search prefix within that level. For example, the search prefix A:0/0, which is the leftmost search prefix within the leftmost leaf node 2-0, is represented by the least significant bit of the span prefix mask associated with the search prefix J at the root node 0-0 and the least significant bit of the span prefix mask associated with the search prefix D within node 1-0. Alternatively, the search prefix A:0/0 could have been represented by setting the least significant bit of a span prefix mask associated with any search prefix in either node 1-0 or 1-1 at Level 1 of the b-tree 40. But, it was only set in the span prefix mask of the search prefix D, which is the smallest search prefix in the leftmost node at Level 1 of the b-tree 40.

Figure 3:
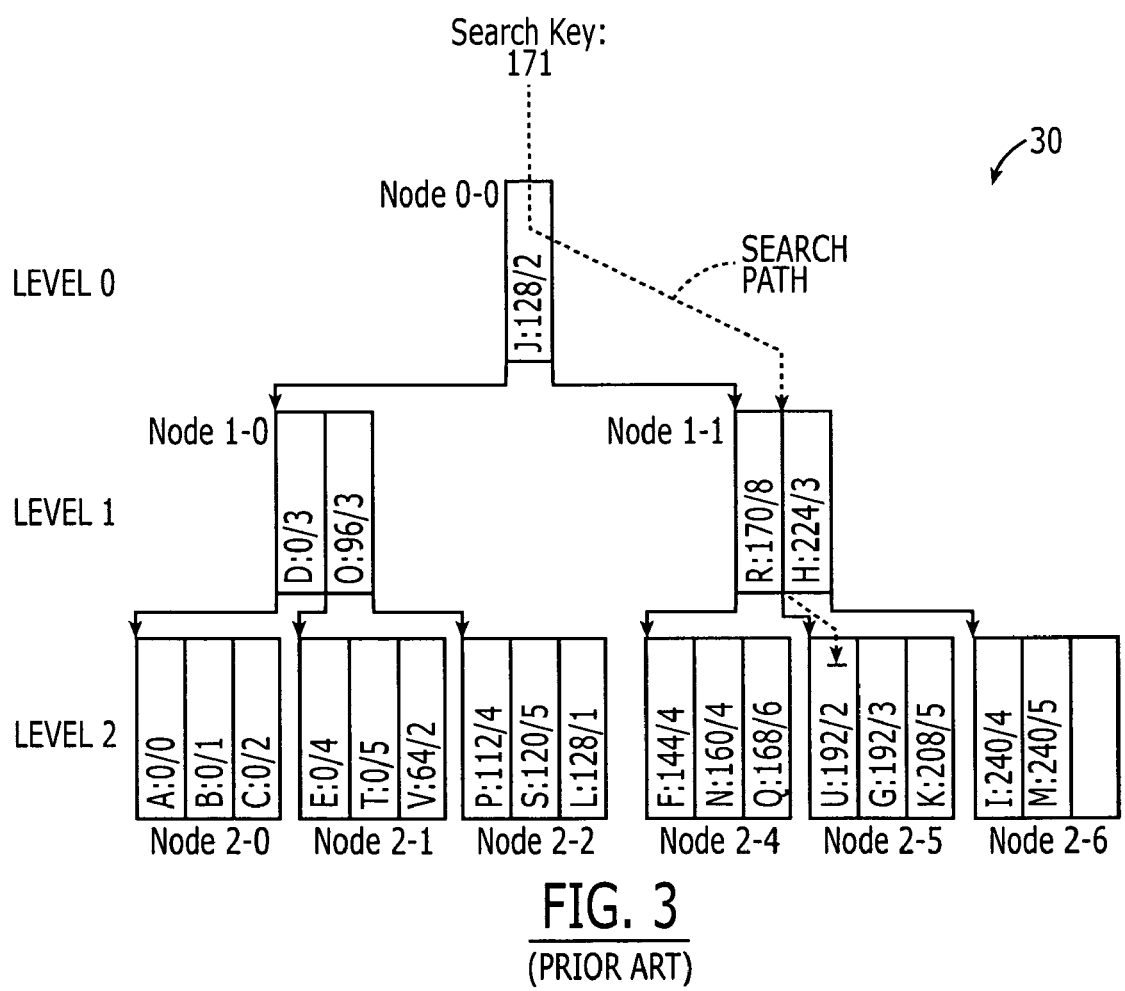
FIG. 3 illustrates a conventional three-level b-tree data structure containing the search prefixes illustrated by FIGS. 1 and 2.
Figure 4B:
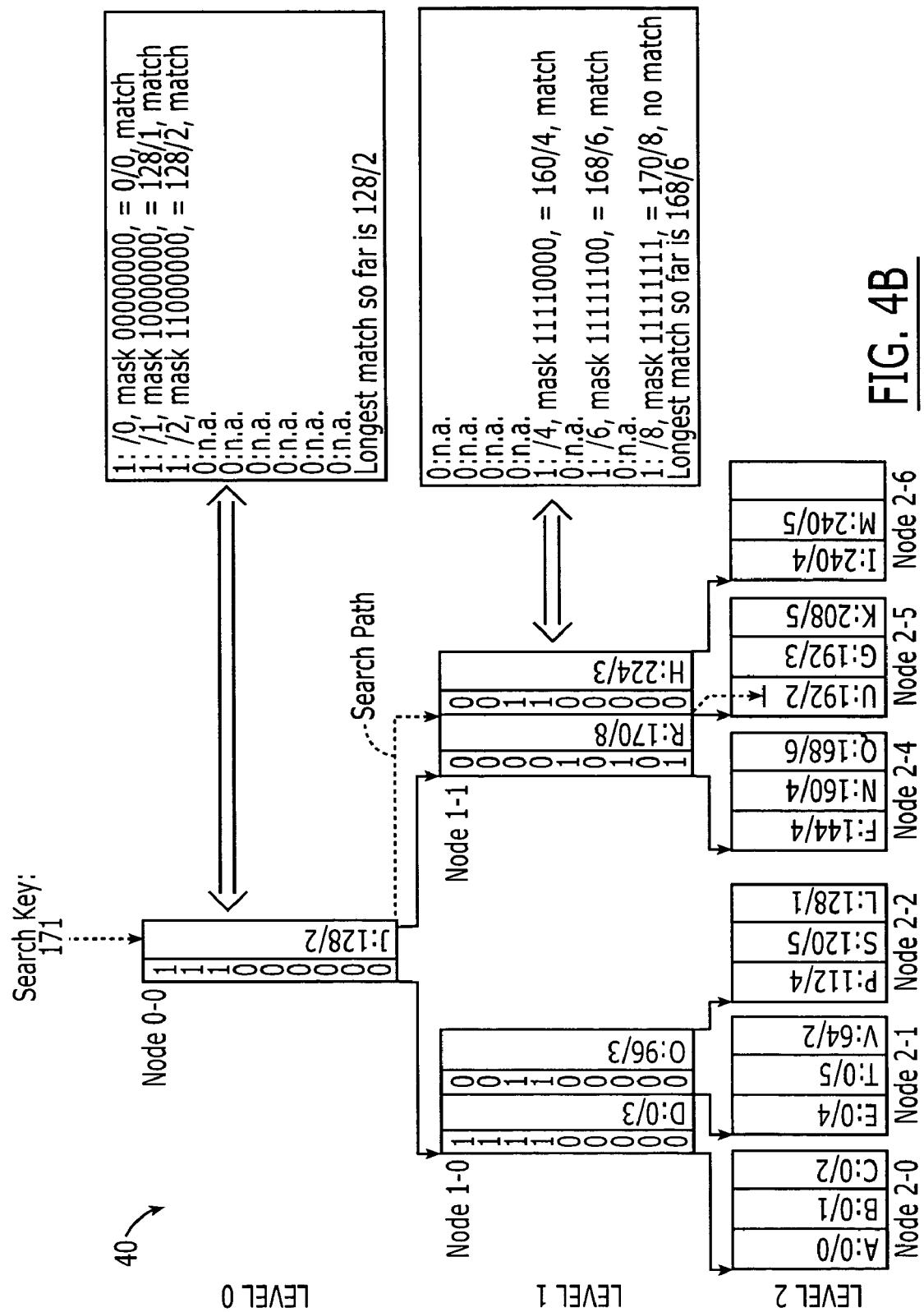
FIG. 4B illustrates an annotated three-level b-tree data structure that contains search prefixes and span prefix masks (SPMs) according to an embodiment of the present invention.

As described previously with respect to FIG. 3, a search of the b-tree 30 in FIG. 3 failed using 171 as a search key because the search prefix Q:168/6, which is the longest prefix match to the search key 171, was not encountered during the search operation. However, the performance of a corresponding search in the b-tree 40 of FIG. 4B results in the correct detection of search prefix Q:168/6 as the longest prefix match to the search key 171. As illustrated by the breakout box to the right of node 0-0 and TABLE 2, a traversal of the search prefix J:128/2 at node 0-0 results in the identification of three (3) matching search prefixes within the b-tree 40. These matching search prefixes include: A:0/0, L:128/1 and J:128/2, with the search prefix J:128/2 being the longest prefix match to the search key 171 at Level 0 of the search operation. Because the search key 171 is greater than 128, the next stage of the search at Level 1 passes down and to the right of node 0-0 to node 1-1. At node 1-1, it is apparent that the search key 171 is greater than the search prefix R:170/8 and less than the search prefix H:224/3, which means the next stage of the search operation at Level 2 passes to node 2-5, which contains no matching search prefixes. Here, the breakout box to the right of node 1-1 shows that the span prefix mask associated with the search prefix R:170/8 identifies three search prefixes (N:160/4, Q:168/6 and R:170/8) as being within the b-tree 40 even though the search path passes to the right of the search prefix R and does not encounter leaf node 2-4 of the b-tree 40, which contains the additional matching search prefixes of N:160/4 and Q:168/6. These three search prefixes are identified by ANDing the vectors 11110000 (corresponding to SPM /4), 11111100 (corresponding to SPM /6) and 11111111 (corresponding to SPM /8) with 170, which is represented in binary format as 10101010b. This ANDing operation is illustrated more fully by TABLE 5. Of the identified search prefixes N:160/4, Q:168/6 and R:170/8 within the breakout box to the right of node 1-1, only search prefix Q:168/6 represents a longest prefix match to the applied search key 171. Thus, even though the search prefix Q:168/6 is not within the search path that extends from node 0-0 to node 1-1 and then terminates at node 2-5, it is properly identified as a longest prefix match with the aid of the SPMs.

Preferred search operations within a search engine device result not only in the detection of a longest prefix match within a database of entries (e.g., a hierarchical memory containing a multi-level b-tree), but also in the generation of result data, which is typically provided to a command host responsible for issuing search and other instructions to the search engine device. This result data, which is referred to herein as "handles," may be maintained within handle memory associated with the search engine device.

One approach to updating a hierarchical memory that supports a b-tree in accordance with FIG. 4A includes representing a handle associated with a search prefix at multiple levels within the b-tree. This incurs the cost of additional handle memory, but allows for highly efficient updates to the hierarchical memory. A requirement that each handle associated with a search prefix be stored up to once for each level of the b-tree can result in the total handle memory size being much greater than the amount of memory needed for one handle times the maximum number of search prefixes supported by the b-tree. However, because there is typically no way to predict or tightly control a distribution of search prefixes and their corresponding handles within a b-tree, the most efficient way to reduce handle memory is by tailoring the shape of a b-tree to minimize handle memory usage. Here, the worst case for handle memory usage is to provide storage for one handle per each bit of each SPM in each node above the leaf level and one handle for each search prefix in each leaf node.

FIG. 4C illustrates the three-level b-tree 40 of FIG. 4A along with a diagram that illustrates an allocation of handle memory 42 to support the b-tree 40. This handle memory 42 includes one handle memory block for each leaf node at Level 2 of the b-tree 40 and one handle memory block for each search prefix at the leaf parent level and higher levels (e.g., Levels 0 and 1) of the b-tree 40. Each handle memory block at the leaf parent level and higher level(s) provides sufficient storage for one handle per bit of the span prefix mask associated with the corresponding search prefix. Accordingly, as illustrated at FIG. 4C, a maximum of nine (9) handles (i.e., W+1 handles) may be stored in a handle memory block associated with the search prefix at the root node (i.e., node 0-0) of the b-tree 40, with the number of valid handles in the handle memory block being equivalent to the number of bits set within the corresponding span prefix mask. Each of the handle memory blocks at the leaf parent level is also configured to store as many as nine (9) handles. Fortunately, each handle memory block at the leaf level, which contains most of the search prefixes within the b-tree, only needs sufficient capacity to store one handle per search prefix within a node at the leaf level. Each handle memory block at the leaf level can be indexed based on the search prefix position of the longest matching prefix within the leaf node at which a search terminated. Moreover, it is only necessary to perform one read operation on the handle memory 42 per search. Thus, there is no need to perform one read operation on the handle memory for each level of the tree as there is when performing a search operation on a hierarchical memory containing the b-tree.

In the search example described above with respect to FIG. 4B, the longest matching prefix was shown to be Q:168/6. The search prefix Q was not found by traversing the node where search prefix Q was located within the b-tree 40, but was instead based on the /6 bit being set in the SPM associated with search prefix R:170/8 at node 1-1, key 0. Indexing the handle memory 42 in FIG. 4C using the position of search prefix R as the reference, identifies a sub-block of handles with valid handles. These valid handles are represented by the handle words corresponding to the /4, /6 and /8 bits of the corresponding SPM. Reading the location in handle memory 42 associated with the /6 bit returns "Handle Q" which is the correct handle for the longest matching prefix Q:168/6.

As illustrated by FIG. 4D, it is possible to save some handle storage space at the leaf parent level within the b-tree for those cases where M<W within the b-tree (i.e., where the number M of search prefixes within each leaf node (e.g., 3) is less than the width of the search prefixes in the b-tree (e.g., 8)). In this special case, instead of needing handle storage space for W+1 (e.g., 9) handles per search prefix, it is only necessary to store M+1 (e.g., 4) handles per search prefix at the leaf parent level. This reduced capacity handle memory 42' is illustrated at FIG. 4D.2.

Figure 5A:
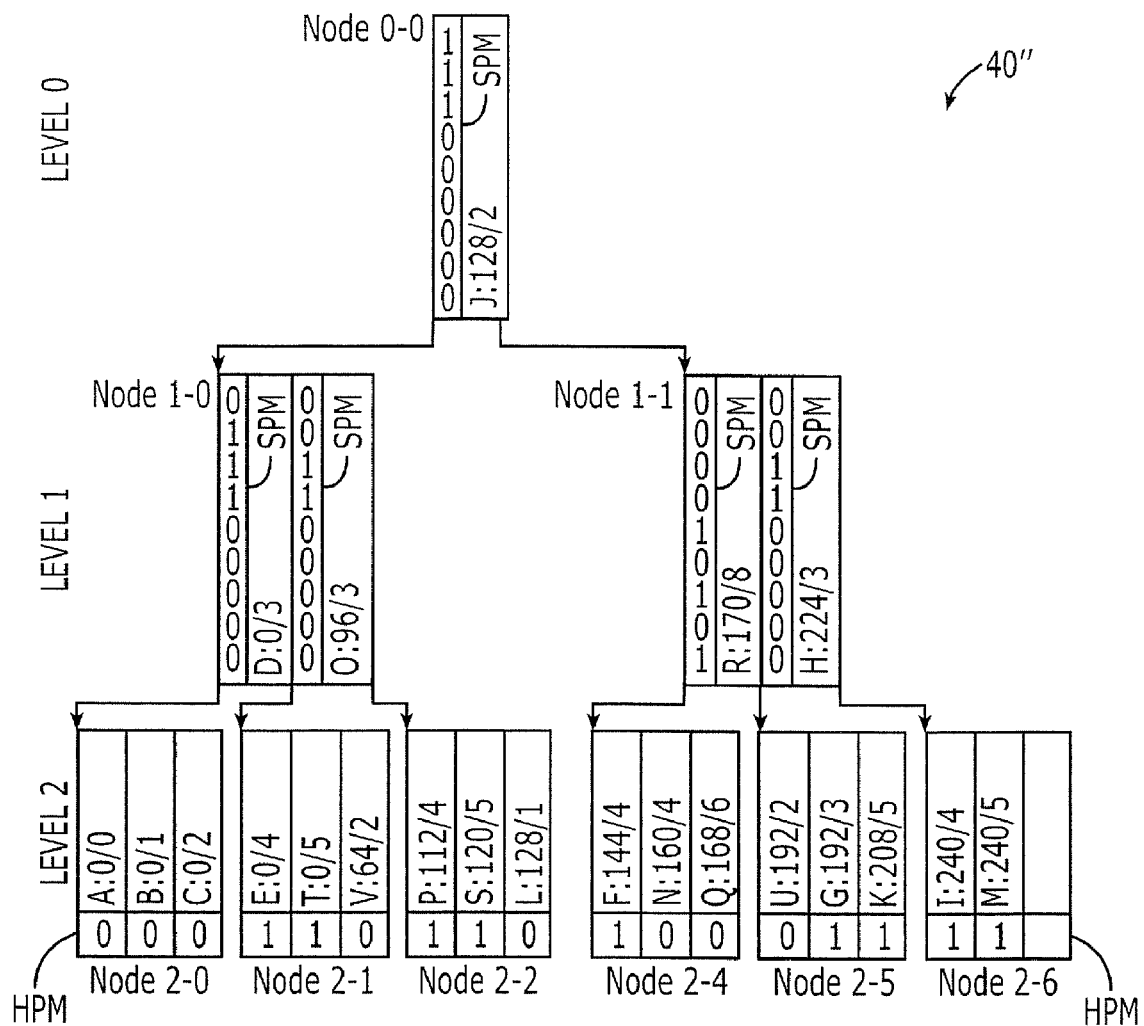
FIG. 5A illustrates a three-level b-tree data structure that contains search prefixes and span prefix masks (SPMs) according to another embodiment of the present invention.

A three-level b-tree data structure 40" that contains search prefixes and span prefix masks (SPMs) according to another embodiment of the present invention is illustrated by FIG. 5A. This b-tree data structure 40" is similar to the b-tree 40 of FIG. 4A, however, three differences are present. The first difference can be understood by evaluating, for example, the span prefix masks (SPMs) associated with the search prefix J at the root node (node 0-0) and the search prefix D at node 1-0, in FIG. 5A. At the root node, the /0 bit of the SPM (i.e., SPM[0]) associated with the search prefix J is set to "1" to thereby reflect the presence of search prefix A at a lower leaf node (i.e., node 2-0). The setting of this bit is consistent with the results illustrated by TABLE 2. However, at node 1-0, the /0 bit of the SPM associated with the search prefix D is held at "0" to thereby remove any identification of the search prefix A at the leaf node 2-0, because it has already been identified by the SPM associated with search prefix J at a higher level within the b-tree 40". Thus, in FIG. 5A, a search prefix is reflected only once in an SPM, and then only at the highest level that it can be represented within the b-tree 40".

The second and third differences are present because it is necessary to know if a handle (i.e., result) associated with a search prefix is stored in memory associated with a location of the search prefix within the b-tree or associated with an SPM bit being set to represent the search prefix at a higher level within the b-tree. In particular, the second difference involves setting a corresponding bit in an SPM to represent the SPM's search prefix only if that search prefix is not identified in another SPM at a higher level within the b-tree. For example, the /2 bit of the SPM corresponding to search prefix J is set to "1" to thereby reflect the search prefix J, and the /3 bits of the SPMs corresponding to the search prefixes D, O and H at nodes 1-0 and 1-1 are all set to "1" because none of these search prefixes are identified in the SPM corresponding to the search prefix J at a higher level in the b-tree 40". However, if the search prefix D, O, or H was identified in the SPM corresponding to search prefix J, then the /3 bit of the corresponding SPM for that search prefix would not be set at level 1 in the b-tree 40". The third difference includes using one "handle present mask" bit (HPM) per search prefix within the leaf nodes to indicate whether the corresponding search prefix has been identified in an SPM at a higher level in a b-tree. Thus, at node 2-0 in FIG. 5A, for example, all mask bits are set to "0" because the search prefixes A, B and C are all represented at higher levels within the b-tree 40". In particular, the search prefix A is identified in the SPM corresponding to the search prefix J at the root node and the search prefixes B and C are identified in the SPM corresponding to the search prefix D at node 1-0. At node 2-1, the mask bits for search prefixes E and T are set to "1" because neither of these search prefixes are represented in an SPM at a higher level node in the b-tree 40". However, the mask bit for the search prefix V is set to "0" because the search prefix V is represented by the /2 bit in the SPM associated with the search prefix O at node 1-0.

Figure 5B:
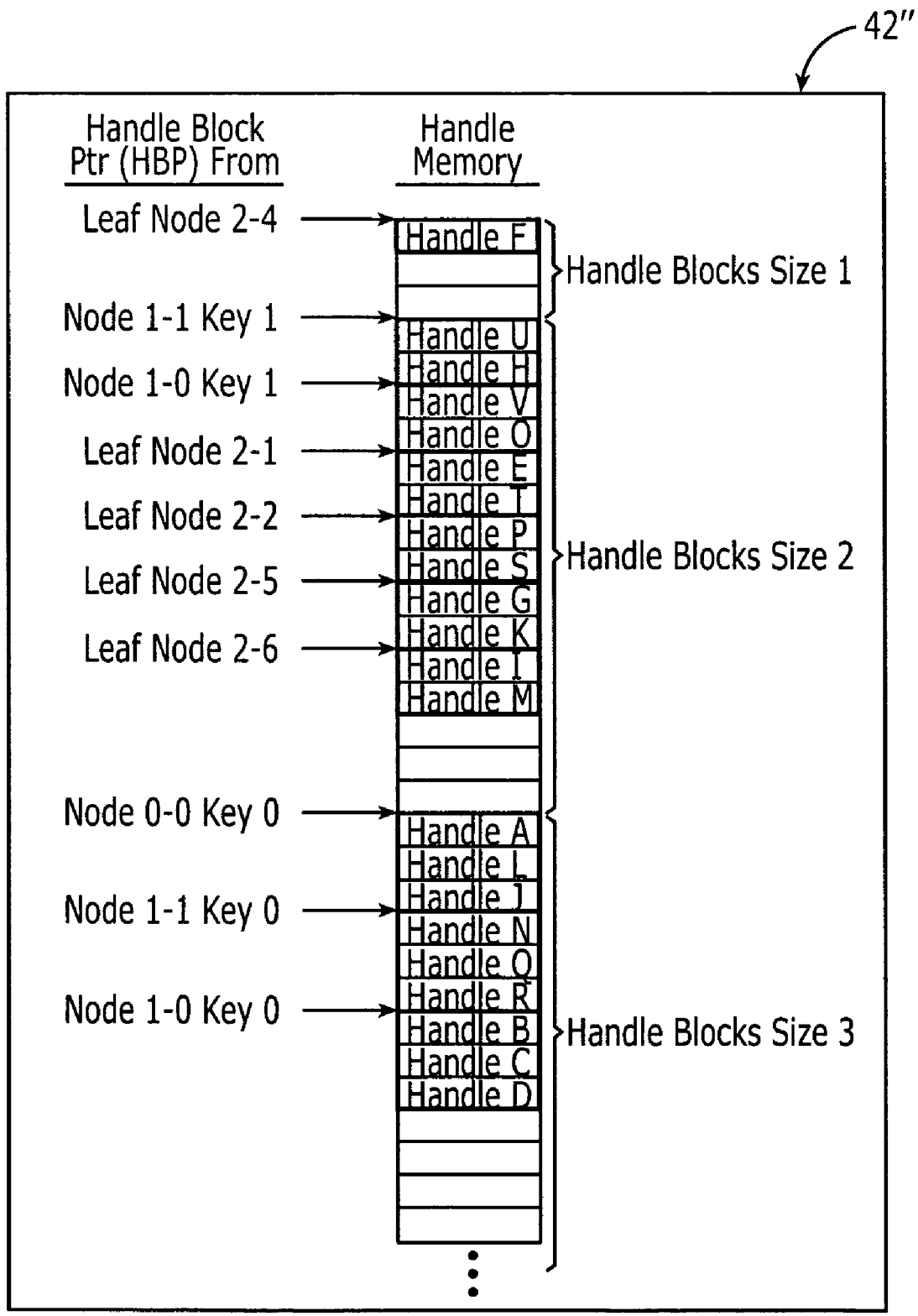
FIG. 5B illustrates an allocation of handle memory that supports the b-tree data structure of FIG. 5A.

Because each search prefix in the b-tree 40" is represented by only one set SPM bit or one set HPM bit, the capacity of a memory needed to support the corresponding handles for the search prefixes in the b-tree 40" can be significantly reduced relative to the handle memories 42 and 42' illustrated by FIGS. 4C.2 and 4D.2. This is because each handle only has to be stored once within a handle memory. As illustrated by FIG. 5B, an exemplary allocation of a handle memory 42" for the b-tree 40" of FIG. 5A includes a variable-sized handle memory block for each search prefix at the leaf parent level or higher and one variable-sized handle memory block for each leaf node. Each leaf node and each search prefix at the leaf parent level or higher may use a corresponding handle block pointer (HBP) to point to a respective handle memory block. Thus, for search prefix J at node 0-0, a respective HBP points to a handle memory block having a capacity of three handles corresponding search prefixes A, L and J. Similarly, for search prefix H (at node 1-1, key 1) an HBP points to a handle memory block having a capacity of two handles corresponding to search prefixes U and H. And, for leaf node 2-5, an HBP points to a handle memory block having a capacity of two handles corresponding to search prefixes G and K.

Finally, because fully specified search prefixes (e.g., search prefix R:170/8 at node 1-1, key 0) cannot be prefixes of other more specific prefixes, they will never be represented in SPMs located at higher levels within the b-tree. Accordingly, whenever a fully specified search prefix is present at a leaf parent level or higher level within a b-tree, the HBP associated with this fully specified search prefix will point to a block of handle memory that is one handle larger than the number of set bits within the SPM corresponding to this fully specified search prefix and the last handle in this block will correspond to the fully specified search prefix. This special case is best illustrated by the handle block in FIG. 5B that corresponds to the search prefix R at node 1-1, key 0. This handle block includes the handles N and Q, which correspond to set bits within the SPM for the search prefix R, and the additional handle R.

Figure 6:
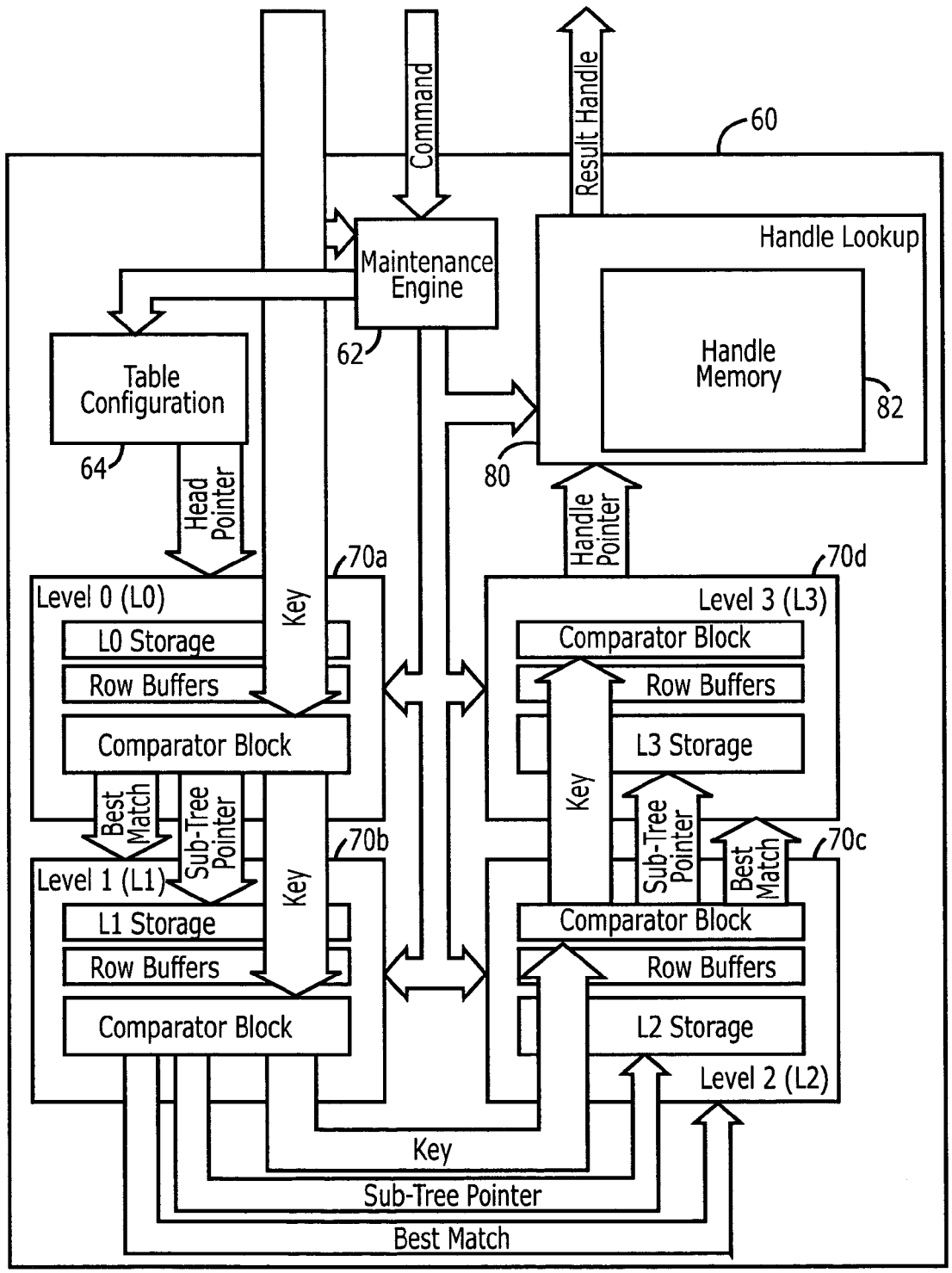
FIG. 6 is a block diagram of a pipelined search engine device that supports the b-tree data structure of FIG. 4B and an allocation of handle memory, according to embodiments of the invention.

FIG. 6 illustrates a block diagram of a pipelined search engine device 60 that supports the above-described b-tree data structures (with SPMs) and handle memory and is responsive to applied search keys and commands. This search engine device 60, which supports multiple four-level b-trees as separate tables (i.e., databases) that share the same node storage and search logic, includes a plurality of pipeline stages 70a-70d dedicated to each b-tree level and a separate pipeline stage 80 for the final result handle lookup and generation of result handles. The first pipeline stage 70a represents a Level 0 block (L0) of the b-tree containing Level 0 storage elements, row buffers (optional in some designs) and comparator logic. The first pipeline stage 70a is responsive to a head pointer and a key. The second pipeline stage 70b represents a Level 1 block (L1) containing Level 1 storage elements, row buffers (optional in some designs) and comparator logic. The second pipeline stage 70b is responsive to a sub-tree pointer, a best match result generated by the first pipeline stage 70a and the key. Similarly, the third pipeline stage 70c represents a Level 2 block (L2) containing Level 2 storage elements, row buffers (optional in some designs) and comparator logic. The third pipeline stage 70c is responsive to a sub-tree pointer, a best match result generated by the second pipeline stage 70b and the key. The fourth pipeline stage 70d represents a Level 3 block (L3) containing Level 3 storage elements, row buffers (optional in some designs) and comparator logic. The fourth pipeline stage 70d is responsive to a sub-tree pointer, a best match result generated by the third pipeline stage 70c and the key. The final pipeline stage is a handle lookup stage 80, which performs handle lookup operations within a handle memory 82 to thereby generate a result handle in response to a handle block pointer.

A table maintenance engine 62 is also provided, which integrates with the four pipeline stages 70a-70d and the handle lookup stage 80. This table maintenance engine 62 performs operations including search key insertion and deletion operations during idle search clock cycles. A table configuration circuit 64 is provided, which can support multiple search trees and map a table ID associated with a received search request to a tree head pointer (HEAD POINTER) for the corresponding table. Because of the pipelined structure of the search engine device 60, the maximum search rate can equal the maximum clock speed supported by the four pipeline stages 70a-70d and the handle lookup stage 80.

The table maintenance engine 62 receives search keys and commands on behalf of the search engine device 60 and forwards search commands to the table configuration circuit 64. The table maintenance engine 62 also queues up any key insert and delete (update) commands it receives for processing because key insertion and deletion typically cannot be completed in a simple single pass through the search engine pipeline. When idle command cycles indicate there are memory access opportunities available to perform table maintenance accesses on the memories (L0, L1, L2, L3) within each pipeline stage 70a-70d and the handle memory 82 within the handle lookup stage 80, the maintenance engine 62 performs maintenance accesses corresponding to portions of a key insert or delete request. The maintenance engine 62 processes one insert or delete request at a time and manages search memory node allocation to thereby allocate free nodes when needed to process key inserts and returning freed nodes to a pool when freed during deletes. To ensure search coherency and permit searching while the maintenance engine 62 processes a key update, the maintenance engine 62 makes a copy of nodes that must be modified while processing updates and only modifies these "temporary" copies. Once all node copies have been modified at all necessary levels for a key update, the maintenance engine 62 updates pointers in all necessary search levels to point to the modified node copies it was working on and reclaims the original nodes, which were copied, for future use. These pointers are updated in a manner that preserves search coherency on every lookup.

Once all temporary node copies at all levels have been properly updated, a special command is executed within the pipeline of stages to thereby cause each level of the b-tree to point to the node copies and reclaim the nodes that are being replaced. This update process propagates through the pipeline across all level at the same speed as a search command. Accordingly, all searches that enter the pipeline before the special command will search against a database before any changes pertaining to the update are applied, but any searches that enter the pipeline after the special command will search against a database that appears to have been instantly and completely modified to reflect the update.

The table configuration circuit 64 receives search commands from the maintenance engine 62, which include a table ID for the table to be searched. The table configuration circuit 64 then maps the table ID, corresponding to a unique b-tree within the search engine device 60, to a root tree node pointer in the Level 0 block 70a. The table configuration circuit 64 then forwards this pointer to the Level 0 block 70a instructing it to perform a search starting at the root node pointed to by the root tree node pointer.

Each of the Level 0, Level 1 and Level 2 blocks 70a-70c corresponds to one of the upper three levels of an SPM b-tree. Each level receives a search key, a sub-tree pointer and an indication of the best match found by the previous levels in the search. In the case of the Level 0 block 70a, which can only represent the root level in the b-tree, this best match indication is always null. A Level 0, Level 1 or Level 2 block reads a search node from its node storage based on the sub-tree pointer it receives and buffers it in a set of flip-flops within its respective row buffer sub-block. Each node stores a set of keys, SPM bit-masks and sub-tree pointers. The comparator sub-block compares the search key to all of the keys and the SPM bit-masks read from the node storage sub-block and determines the best match for the search key, if any, and also determines which of the node's sub-tree pointers the search should follow for the next level of the search. The Level 0, Level 1 or Level 2 block forwards the sub-tree pointer it finds to the next lower level block along with the search key. If the next lower level block finds a new best match, then this best match for the search key is forwarded to the next lower level search stage. However, if no new best match is found, then the best match from the previous higher stage is forwarded to the next stage.

The Level 4 block corresponds to the leaf level of the SPM b-tree. It receives a search key, sub-tree pointer and any indication of a best match from the previous levels in the search. The Level 4 block reads a search node from its node storage based on the sub-tree pointer that it receives and buffers it in a set of flip-flops within its row buffer sub-block. The comparator sub-block compares the search key to all of the keys read from the node storage sub-block and determines a best match, if any. If the Level 4 block finds a new best match for the search key, then it forwards its own best match as the handle pointer to the handle lookup block 80. Otherwise, if no new best match is found, then the best match received from the prior stage is passed as the handle pointer.

The handle lookup block 80 receives an indication of the best match found by the Level 0-Level 3 search stages 70a-70d and uses the best match as an index to lookup a search result handle in the handle memory 82. In response to the index, the handle memory 82 outputs a retrieved handle as the result handle (i.e., the search result).

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. An integrated circuit search engine device, comprising:
   a hierarchical memory configured to store a b-tree of search prefixes and span prefix masks therein, said span prefix masks having values that are evaluated during a search operation to identify one or more search prefixes that match an applied search key yet reside at least one node of the b-tree that is not traversed during the search operation; and
   search logic configured to search the b-tree of search prefixes in said hierarchical memory by evaluating at least one search prefix and corresponding span prefix mask at a first node of the b-tree within a search path of the b-tree during the search operation to thereby identify any prefixes that match the applied search key yet reside at a second node of the b-tree that is lower in the b-tree relative to the first node and outside the search path of the b-tree when the b-tree is traversed during the search operation.

2. The search engine device of claim 1, further comprising:
a handle memory configured to support a respective handle memory block for each search prefix within each of a plurality of nodes of the b-tree that resides at a leaf parent level within the b-tree.

3. The search engine device of claim 2, wherein a first one of the handle memory blocks has sufficient capacity to support one result handle per bit within a span prefix mask associated with a corresponding search prefix.

4. The search engine device of claim 2, wherein a first one of the handle memory blocks has sufficient capacity to support only M+1 handles, where M is a positive integer corresponding to a quantity of search prefixes supported by each of a plurality of leaf nodes within the b-tree.

5. The search engine device of claim 4, wherein said handle memory is further configured to support a plurality of handle memory blocks that are associated with corresponding ones of the plurality of leaf nodes and have a capacity of only M handles.

6. The device of claim 1, wherein each of said span prefix masks has a set bit that specifies a prefix length of a search prefix to which it corresponds.

7. A method of searching a b-tree of search prefixes within a hierarchical memory, comprising the steps of:
determining a first span prefix mask associated with a first search prefix in the b-tree by identifying at least a second prefix in the b-tree that is a shorter prefix of the first search prefix and setting a bit in the first span prefix mask that identifies the second prefix; and
evaluating span prefix masks associated with each of a plurality of search prefixes located at first nodes within the b-tree during a search operation to thereby identify search prefixes that match an applied search key yet reside at nodes of the b-tree that are not traversed during the search operation.

8. An integrated circuit device, comprising:
a pipelined search engine configured to support a tree of search prefixes therein that utilizes span prefix masks to assist longest prefix match (LPM) detection when the tree is searched, wherein the pipelined search engine comprises search logic that is configured to detect any matching prefixes at a first leaf node of the tree that is outside a search path of the tree during a search operation, by:
evaluating at least one search prefix and corresponding span prefix mask associated with a leaf parent node of the tree to thereby identify a search prefix in the first leaf node that is a first prefix match to a search key associated with the search operation; and then
searching a second leaf node of the tree that is within the search path of the tree during the search operation to thereby identify whether a longer second prefix match is present therein relative to the first prefix match within the first leaf node.

* * * * *